US008777714B2

(12) United States Patent
Thomas

(10) Patent No.: US 8,777,714 B2
(45) Date of Patent: Jul. 15, 2014

(54) SYSTEMS AND METHODS OF ELECTRONIC GAMING

(75) Inventor: Ralph Thomas, Plantation, FL (US)

(73) Assignee: Ralph Thomas, Plantation, FL (US)

( * ) Notice: Subject to any disclaimer, the term of this patent is extended or adjusted under 35 U.S.C. 154(b) by 19 days.

(21) Appl. No.: 13/179,352

(22) Filed: Jul. 8, 2011

(65) Prior Publication Data

US 2013/0012283 A1 Jan. 10, 2013

(51) Int. Cl.
*A63F 13/00* (2014.01)
*G06F 17/00* (2006.01)
*G06F 19/00* (2011.01)

(52) U.S. Cl.
USPC .................. 463/16; 463/11; 463/12; 463/13; 463/20

(58) Field of Classification Search
USPC .......................................... 463/11–13, 16, 20
See application file for complete search history.

(56) References Cited

U.S. PATENT DOCUMENTS 6,174,235 B1 * 1/2001 Walker et al. .................. 463/25
6,656,040 B1 * 12/2003 Brosnan et al. ................ 463/16
6,769,982 B1 * 8/2004 Brosnan .......................... 463/16
6,896,618 B2 * 5/2005 Benoy et al. .................... 463/25
6,918,834 B2 * 7/2005 Vancura .......................... 463/25
7,004,834 B2 * 2/2006 Walker et al. .................. 463/16
7,140,964 B2 * 11/2006 Walker et al. .................. 463/25
7,300,351 B2 * 11/2007 Thomas .......................... 463/20
7,666,098 B2 * 2/2010 Hecht et al. ..................... 463/35
7,677,968 B2 * 3/2010 Schultz et al. .................. 463/20
7,708,642 B2 * 5/2010 Hecht et al. ..................... 463/35
7,874,914 B2 * 1/2011 Walker et al. .................. 463/25
8,016,674 B2 * 9/2011 Lucchesi et al. ................ 463/35
8,105,149 B2 * 1/2012 DeWaal .......................... 463/20
8,113,946 B2 * 2/2012 Walker et al. .................. 463/25
8,162,734 B2 * 4/2012 Shinoda .......................... 463/11
8,221,215 B2 * 7/2012 Walker et al. .................. 463/20
8,262,467 B2 * 9/2012 Jaffe .............................. 463/25
8,337,309 B2 * 12/2012 Okuniewicz .................... 463/41
8,388,438 B2 * 3/2013 Englman et al. ................ 463/25
8,672,740 B2 * 3/2014 Nicely ............................ 463/21
8,672,762 B1 * 3/2014 Basallo et al. .................. 463/37
2002/0183105 A1 * 12/2002 Cannon et al. .................. 463/16
2003/0144052 A1 * 7/2003 Walker et al. .................. 463/20
2003/0228901 A1 12/2003 Walker et al.
2006/0073881 A1 * 4/2006 Pryzby et al. .................. 463/20
2006/0111168 A1 * 5/2006 Nguyen et al. .................. 463/16
2006/0111172 A1 * 5/2006 Walker et al. .................. 463/16
2006/0178187 A1 * 8/2006 Walker et al. .................. 463/16
2006/0247064 A1 11/2006 Nguyen et al.
2006/0287040 A1 * 12/2006 Walker et al. .................. 463/16
2007/0060274 A1 3/2007 Rowe et al.
2007/0072677 A1 * 3/2007 Lavoie et al. .................. 463/42

(Continued)

OTHER PUBLICATIONS

International Search Report and Written Opinion from related PCT application No. PCT/US2012/045826, mailed Jan. 30, 2013, 13 pages.

*Primary Examiner* — William H McCulloch, Jr.
(74) *Attorney, Agent, or Firm* — Foley & Lardner LLP

(57) ABSTRACT

During operation of a gaming machine, information about future game outcomes is provided to player-users. A processor of the machine determines outcome(s) of the one or more selected games; stores the outcome(s) on non-transient storage media of the machine; and relays information, through an output device of the machine, about at least one of said outcome(s), before one or more selected games has been played.

30 Claims, 4 Drawing Sheets

(56) References Cited

U.S. PATENT DOCUMENTS

| | | | | |
|---|---|---|---|---|
| 2007/0077978 | A1* | 4/2007 | Walker et al. | 463/16 |
| 2009/0305765 | A1* | 12/2009 | Walker et al. | 463/20 |
| 2010/0056253 | A1* | 3/2010 | Lewis | 463/20 |
| 2010/0285869 | A1* | 11/2010 | Walker et al. | 463/25 |
| 2011/0118011 | A1* | 5/2011 | Filipour et al. | 463/27 |
| 2011/0124402 | A1 | 5/2011 | De Waal et al. | |
| 2012/0040730 | A1* | 2/2012 | Stern et al. | 463/13 |
| 2013/0012283 | A1* | 1/2013 | Thomas | 463/16 |
| 2013/0084938 | A1* | 4/2013 | Nicely | 463/20 |
| 2013/0084939 | A1* | 4/2013 | Nicely | 463/20 |
| 2013/0084952 | A1* | 4/2013 | Nicely | 463/25 |
| 2013/0084953 | A1* | 4/2013 | Nicely | 463/25 |
| 2013/0084954 | A1* | 4/2013 | Nicely | 463/25 |
| 2013/0084988 | A1* | 4/2013 | Nicely | 463/42 |
| 2013/0084989 | A1* | 4/2013 | Nicely | 463/42 |
| 2013/0084990 | A1* | 4/2013 | Nicely | 463/42 |
| 2014/0087879 | A1* | 3/2014 | Basallo et al. | 463/37 |

* cited by examiner

SYSTEMS AND METHODS OF ELECTRONIC GAMING

BACKGROUND

1. Field of the Invention

Embodiments of the present invention relate generally to systems and processes for electronic gaming machines.

2. Related Art

Typical slot machines operate under a common, general principle of operation: a player puts money or credits into a machine, presses a button or pulls an arm to begin play, and plays out the game. Information about the results of the game is not determined or disclosed to the player until after the player presses the button to begin play.

SUMMARY OF THE DISCLOSURE

Various embodiments of the present invention provide a process or system for operating a machine for playing games. According to example embodiments, a processor of the machine selects one or more games to be played on the machine. The processor determines outcome(s) of the one or more games. These outcome(s) are stored on non-transient storage media of the machine. After the outcome(s) have been determined and before the one or more of the selected games has been played, information is displayed through an output device of the machine.

Some embodiments of the present invention include an output device that is an audible and/or visible device. Some embodiments have an output device that includes an electronic image or video display.

Some embodiments of the present invention comprise electronic gaming machines including, but not limited to, slot machines, electronic blackjack machines, electronic keno machines, electronic poker machines, video poker machines, or the like. Slot machines according to some embodiments include, but are not limited to, video reel machines, physical reel machines, multi-layer display machines, wide-area progressive machines, or the like.

Various embodiments of the present invention provide a process or system which determines, with a processor of the machine, whether a communication trigger has occurred. Whether the information is relayed, through an output device of the machine, about at least one of said outcome(s), is at least partially dependent on whether a communication trigger has occurred. In some embodiments, a communication trigger occurs when a predetermined number of games has been played. In some embodiments, a communication trigger is that the user has paid a predetermined amount of credits or money. In some embodiments, a communication occurrence is determined at least in part on an output of a random number generator.

DETAILED DESCRIPTION

According to various embodiments of the present invention, outcome information about a game is displayed to the player-user before the game is played. In some embodiments, gaming machines, such as slot machines, determine outcomes for one or more games to be played in the future. Then, information about the outcome of the one or more future games is provided to the player-user through an output device, such as, but not limited to, a video monitor. The future game(s) is played after this information about the corresponding outcome is provided to the player-user.

Figure 5:
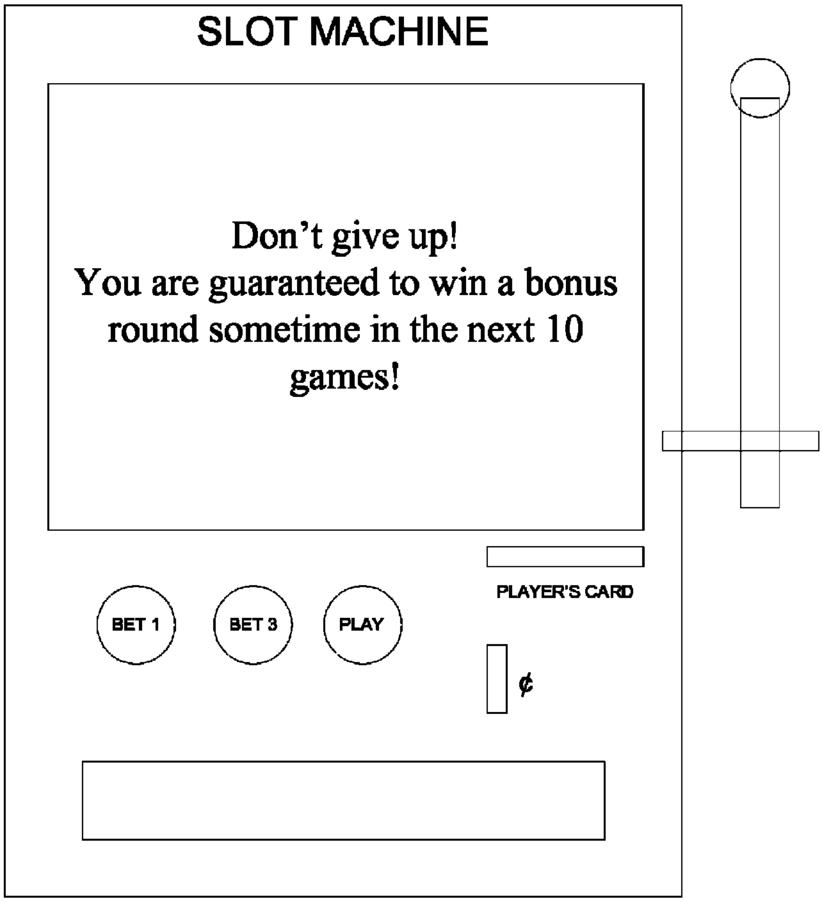
FIG. 5 is a generalized view of a gaming machine that is configured to display information related to a future game outcome to the player-user, according to an embodiment of the present invention.

Displaying information regarding outcomes of future games can help encourage the player-user to continue playing on the same gaming machine, rather than leave to play a different machine or leave the casino altogether. For example, if one of the outcomes for a future game will result in the award of a bonus round to the player-user, some embodiments communicate this message to the player-user through the machine's video display. Messages that may be communicated to the player-user include, but are not limited to, a message stating that the player-user is guaranteed to win within a defined period, for example, "You are guaranteed to win a bonus round sometime in the next 10 games! Keep playing!" On a video poker machine, some embodiments "flash" cards to the player-user on the display, indicating that the next hand played will contain one or more particular cards (for example, but not limited to, that the hand will contain at least two aces). According to other embodiments, machines may flash an upcoming playing tile, or display information regarding an upcoming jackpot, etc. An exemplary slot machine with a display reporting the information to the player-user, according to some embodiments of the invention, is shown in FIG. 5.

In further embodiments, information generated regarding outcomes of future games can be provided or made available to the entity operating the game so that the operating entity can prepare for upcoming events. In some embodiments, operators, such as casino employees, are notified in advance that a particular slot machine is about to award a jackpot. Thus, in some embodiments, security personnel or systems are alerted in advance, a floor manager is alerted so that he or she can prepare the money to avoid requiring the winner to wait, or the event is captured on camera as it happens. In some embodiments, other customers in the casino are notified over a loudspeaker, on video monitors, or by email or text message, to create excitement about an upcoming or impending win and/or encourage players to start playing slot machines right away.

According to some embodiments, the determined outcome is the full outcome of a single game. According to other embodiments, the determined outcome is a portion of the outcome of a game. This may include, but is not limited to, one card (or multiple cards) of a poker hand, one (or multiple) reel results of a multi-reel slot machine, etc. According to further embodiments, a single game may include multiple levels (for example, but not limited to, multiple draws of a five-card draw poker game), and the determined outcome may include the outcome(s) of one or more of those levels.

According to some embodiments of the invention, when the player-user starts the game (such as, but not limited to, by pressing the “Play” button of a slot machine), the machine checks to see if the outcome of this game has been previously determined. If it has, the game is played using the previously-determined outcome. If not, the machine randomly selects the number of games to be predetermined in advance of the game play. In some embodiments, the number of games to be predetermined has been pre-set into the machine. For example, in some embodiments, the number of games to be predetermined is a pre-set number (an integer greater than zero) such as, but not limited to, ten, and in other embodiments, it is a variable number within a pre-set range of numbers (integers greater than zero), such as, but not limited to, between one and five. The machine determines the outcomes of each of those games to be predetermined. Information related to one or more of these outcomes is then provided to the player-user, before the corresponding game is played. When the corresponding game is played, the actual outcome matches the outcome that was predetermined for that game.

In some embodiments, the machine gives the player-user the option to buy information about one or more future game outcomes. In some embodiments, the machine provides the information for free. In some embodiments, the machine provides the information to a player-user as part of an award, bonus, gift, or the like, for example, for the user having an achievement or accomplishment in a pervious or related game on the same or different machine, such as, but not limited to, winning a game or obtaining a particular point score, value, card hand, or the like.

In some embodiments, the machine gives the player-users an option to skip the currently generated game. According to one non-limiting example, suppose the player-user pays to see if the video poker hand that will be dealt to him/her next includes at least a pair. If it does not, then the player-user is given an option to skip that hand and move on to the next game.

In embodiments of the present invention, the results of future games are generated, and the player-user is informed about at least part of these results, before these games are played. This is in contrast to generating multiple games, all to be played simultaneously. However, in some embodiments of the present invention, multiple games that will be played simultaneously also have predetermined outcomes stored in system memory and information about the outcomes is relayed to the player-user in advance of the play of those games. In further embodiments, predetermined outcomes of one or more future games associated with one or more (or all) simultaneously-played games are determined in advance of the simultaneous games and information about the outcomes is relayed to the player-user in advance of the play of the future games.

Figure 1:
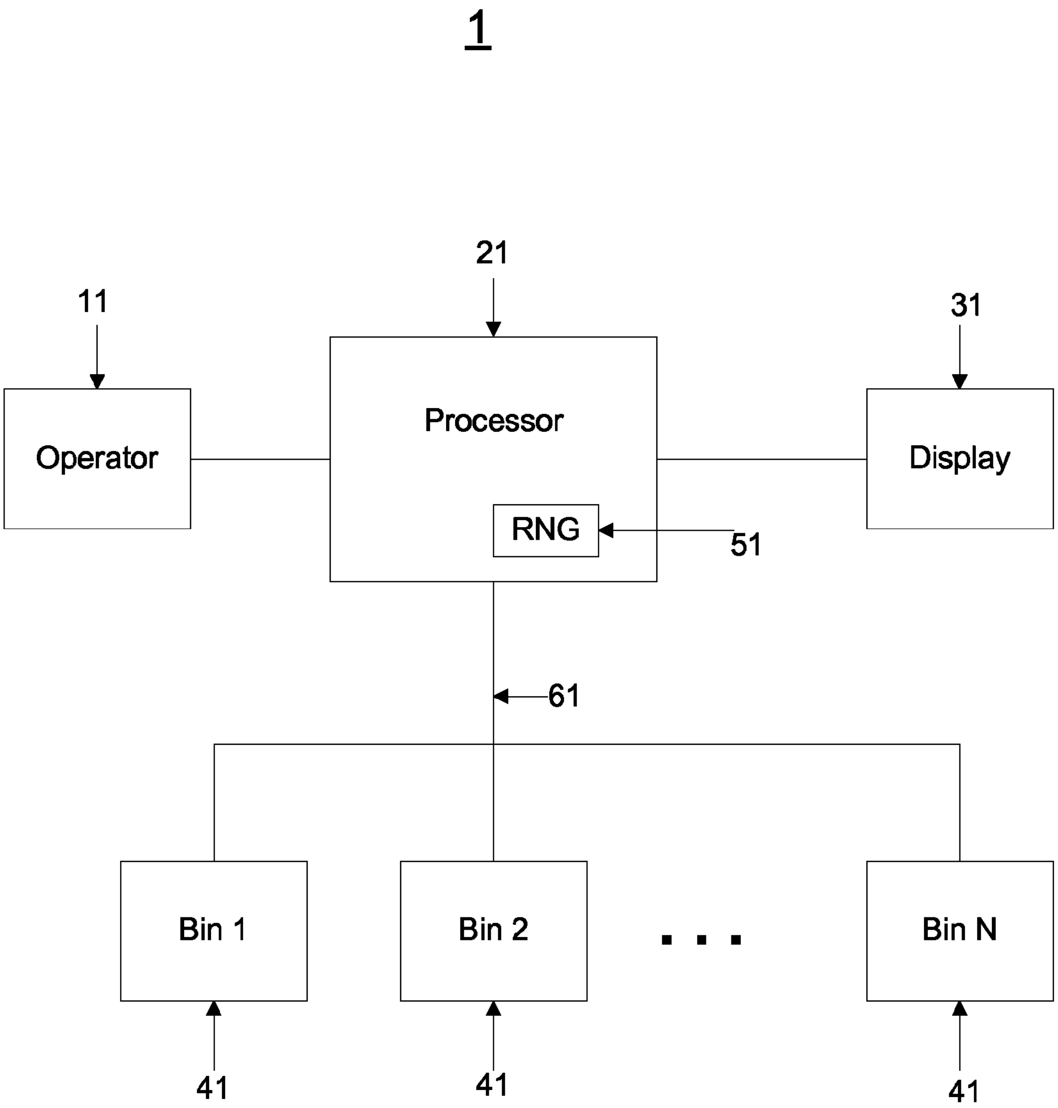
FIG. 1 is a schematic diagram of a system in accordance with an embodiment of the present invention.

FIG. 1 illustrates a non-limiting system according to some embodiments of the present invention. As shown in FIG. 1, an exemplary system 1 for implementing method(s) according to embodiments of the present invention includes, but is not limited to, a computing device in a slot machine. In other embodiments, the computing device may be included in other suitable devices or have other suitable forms, such as, but not limited to computing devices in special-purpose game machines, general purpose computers operating gaming programs, or the like. The computing device includes a processing unit 21, which includes or accesses a random number generator (“RNG”) 51, a system memory 41 and a system bus 61 that couples various system components including the system memory 41 to the processing unit 21. The processing unit 21 comprises one or more electronic processors configured (by hardware, software, or both) to perform functions described herein. In some embodiments, an operator 11 of the system 1 interacts with the system 1 to configure the settings of the system 1. The processing unit 21 outputs information to an output device, for example, a display 31.

The display 31 of FIG. 1 is one example of an output device that can provide advance information about upcoming games. Other embodiments employ one or more other suitable output devices described below. According to some embodiments of the invention, such output devices provide information from the machine to a person (or people) or to another device or machine. In some embodiments, devices providing information to a user include devices that are visible and/or audible to the user, passersby, or the like. In some example embodiments, the visible device of the machine is a visual display such as a computer monitor or PDA display, a light, or any visible mechanism for notifying someone of information related to one or more predetermined game outcomes. In some example embodiments, the audible device of the machine is a bell, whistle, siren, speaker, or anything else that makes noise which can notify someone of information related to one or more predetermined game outcomes. In some embodiments, the output device providing information to another device or machine includes, for example, a device that transmits information to a remote computer through, for example (but not limited to) a direct connection, a network such as a local area network (LAN) or a wide area network (WAN), or the internet. In some embodiments, information that is received is, for example (but not limited to), processed by a general purpose computer, relayed to another player-user on another gaming machine, relayed to casino personnel, relayed to a device audible or visible to casino visitors (for example, but not limited to, a moving message sign), or the like. Relaying such information to casino personnel is useful for notifying the floor manager of a casino, security, other players or casino visitors, or anyone else that an event is about to occur. Combinations of the above are also to be included within the scope of output devices.

In various embodiments, the system memory 41 includes a computer-readable, non-transient storage medium. The storage medium is coupled with the processing unit 21 via a system bus 61, so that outcome(s) of future games determined by the processing unit 21 can be stored in the storage medium. In some embodiments, the non-transient medium is any available medium that can be accessed by a general purpose or special purpose computer or server. In some example embodiments, the non-transient storage medium comprises random-access memory (RAM), read-only memory (ROM), erasable programmable read-only memory (EPROM), electrically erasable programmable read-only memory (EEPROM), field programmable gate array (FPGA), flash memory, compact disk or other optical disk storage, magnetic disk storage or other magnetic storage devices, or any other medium which can be used to carry or store data and which can be accessed by a general purpose or special purpose computer. In further embodiments, the non-transient storage medium includes combinations of the above and/or volatile computer memory, non-volatile computer memory, and combinations of volatile and non-volatile computer memory.

In addition to a system, various embodiments are described in the general context of methods and/or processes, which is implemented in some embodiments by a program product including computer-executable instructions, such as program code, executed by the processing units 21 of computers in networked environments. The terms "method" and "process" are synonymous unless otherwise noted.

In some embodiments, the method(s) and/or system(s) discussed throughout are operated in a networked environment using logical connections to one or more remote computers having processors. In some embodiments, logical connections include a LAN, WAN, and/or personal area network (PAN) that are presented here by way of example and not limitation. Such networking environments are commonplace in office-wide or enterprise-wide computer networks, intranets, and the Internet. Those skilled in the art will appreciate that such network computing environments will typically encompass many types of computer system configurations, including personal computers, hand-held devices, multi-processor systems, microprocessor-based or programmable consumer electronics, network PCs, minicomputers, mainframe computers, and the like, and also encompass systems including specialized gaming machines such as slot machines and video poker machines. In some embodiments, connections are wireless or wired connections, or are partially wired and partially wireless. In some embodiments, connections from gaming devices are directly to other gaming devices or general- or special-purpose computers, hand-held devices, or the like (using, for example, but not limited to, radio or cellular transmissions or direct wired connections).

In some embodiments, the method(s) and/or system(s) discussed throughout are operated in distributed computing environments in which tasks are performed by local and remote processing devices that are linked (either by hardwired links, wireless links, or by a combination of hardwired or wireless links) through a communications network. In a distributed computing environment, according to some embodiments, program modules are located in both local and remote memory storage devices. In various embodiments, data are stored either in repositories and synchronized with a central warehouse optimized for queries and/or for reporting, or stored centrally in a database (e.g., dual use database) and/or the like.

Some embodiments of the present invention use just one processor of a computer system. Other embodiments use multiple processors. In some embodiments involving multiple processors, the processors are in the same computing device or machine. In other embodiments, the processors are in more than one computing device or machine.

According to some embodiments of the present invention, a gaming machine such as a slot machine includes a processing unit 21 configured to determine and store, in system memory 41, multiple outcomes of upcoming games. These outcomes are determined by multiple uses of a RNG 51. The outcomes are stored in conceptual "bins" 41. These bins 41 are implemented by non-transient memory. The number of bins 41, N, is determined when the machine is configured. The bins 41 are referred to here as being numbered 1, 2, 3, . . . N.

According to some embodiments, not all of the bins 41, numbered 1, 2, 3, . . . N, are filled every time outcomes are generated. The number of bins 41 to be filled, B, is a number between 1 and N. In some embodiments, the value of B is set when the machine is configured. In some embodiments, the value of B is determined during game play, for example, by a RNG 51. In some embodiments, the value of B is determined by the identity or classification of the player-user. For example, in some embodiments, the casino's best customers, return customers, or new customers would have B set to a larger value than other customers. In some embodiments, the player-users themselves are able to affect the value of B by paying extra money or credits for the value of B to be set to a larger value. In some embodiments, the value of B increases or decreases after a predefined event has occurred, such as after a jackpot hits. According to some embodiments, the probability of having a successful outcome (a winning game or hand) is set to be higher for some bins 41 than for others.

According to some embodiments, the processing unit 21 fills the bins 41, numbered 1, 2, 3, . . . B, with predetermined game outcomes when the processing unit 21 determines that all of the bins 41 are empty. In some embodiments, the processing unit 21 fills the bins 41 when a communication trigger occurs. In some embodiments, the communication triggers are defined at the time the machine is initially configured. In other embodiments, the communication triggers are defined or can be changed after the machine is initially configured, during the runtime of the machine.

A communication trigger is an event or situation that determines whether information about future outcomes will be provided to the player-user. In various embodiments, one or more predefined events is set as a communication trigger. For example, in some embodiments, a communication trigger is that the player-user has played a predefined number of games (for example, but not limited to, 100). In some embodiments, a communication trigger is that the player-user has paid a predefined amount of credits or money. In some embodiments, a RNG 51 is used to select a number within a predefined range of numbers (such as, but not limited to, a number within the range of one and ten), and a communication is triggered if the selected number is greater than, less than, or equal to a predefined number (such as, but not limited to, greater than five). In some embodiments, a communication trigger is that the player-user has achieved a predefined goal in a game, such as, but not limited to, a bonus round or a predefined amount of money or credits. In some example embodiments, a communication trigger is that a future game outcome will be a winning game, or award the player-user a bonus round, or win the player-user a predefined amount of money or credits.

In some embodiments, multiple events or conditions are required to occur for a single communication trigger. In some example embodiments, two events or conditions are required for a single communication trigger. For example, in some of those embodiments, a RNG 51 is used to select a number (for instance, but not limited to, between one and ten), and a communication is triggered if both the RNG 51 result is within a predetermined range (for instance, but not limited to, greater than five but less than or equal to the maximum, ten) and a future game will have a particular outcome (for instance, but not limited to, awarding a player-user a bonus round). In other example embodiments, three or more events or conditions are required for a single communication trigger. For example, in some of those embodiments, a communication trigger is if the RNG 51 result is within a predetermined range (for instance, but not limited to, greater than five but less than or equal to the maximum, ten), a future game will have a particular outcome (for instance, but not limited to, awarding a player-user a bonus round), and the number of bins 41 that are not empty is within a predetermined range (for instance, but not limited to, greater than three but less than or equal to the maximum, B).

According to some embodiments, as each game is played, the processing unit 21 directs the system memory 41 to delete the corresponding game outcome from the bins 41. For example, in some embodiments, outcomes are deleted from the bin 41 starting with the highest bin 41 number (1, 2, 3, . . . B) that contains an outcome. The outcomes are deleted, one by one, until only the outcome that is in the bin 41 numbered "1" is left. Playing the next game then causes that last game outcome to be deleted from the bins 41.

According to some embodiments, the type of information, amount of information, and the like to be provided to the player-user is determined at the time the machine is configured. In other embodiments, it is dependent on the communication trigger. In some example embodiments, if one of the future outcomes will result in an event (such as, but not limited to, a bonus round), the player-user is informed that the event will occur or will occur within the next x number of games (where x is an integer greater than zero). In some example embodiments, if one of the future outcomes will contain a particular result or results (such as, but not limited to, a winning game), the player-user is informed that the result or results is coming or coming within the next y number of games (where y is an integer greater than zero). In some example embodiments, if one of the future outcomes will result in an award of at least a predefined amount, the player-user is informed that an upcoming game will result in a payout of at least a predefined amount. In some example embodiments, if one of the future outcomes will result in a predefined card or cards of a poker hand (for example, but not limited to, at least one pair or at least a park of Jacks), the player-user is informed that such card or cards will be included in an upcoming game (for example, within a specified number of games). In other embodiments, other types of information regarding one or more upcoming games may be provided to the player-user.

According to some embodiments, if a machine is configured to respond to multiple communication triggers, it is possible that more than one communication trigger could occur before the machine relays related information to the player-user. In that case, the processing unit 21 is configured to implement a suitable contention policy, for example, but not limited to, giving the player-user information corresponding to multiple communication triggers, none of the triggers, or just one of the triggers.

The following are non-limiting examples of multiple competing communication triggers and contention policies for such triggers. In some embodiments, the contention policy between two communication triggers is to relay information related to both communication triggers to the player-user. In other embodiments, the contention policy is to relay information related to only one of the communication triggers to the player-user. For instance, in some example embodiments, if one of the upcoming outcomes will (a) award the player-user with a bonus round, and one of the upcoming outcomes will (b) pay out an award of at least a predefined amount of money or credits, then the machine is configured to inform the player-user only of outcome (a), that one of the upcoming games result in a bonus round. In that case, the player-user is not notified of information related to outcome (b), that one of the upcoming outcomes will pay out an award of at least a predefined amount.

In some embodiments, if there are three or more communication triggers, the contention policy is to relay information related to a subset (for example, but not limited to, one, two, three, or all) of the communication triggers to the player-user, while information related to the remaining communication triggers (if any) will not be relayed. For instance, in some example embodiments, if three events (c), (d), and (e) occur that are each communication triggers, the machine will inform the player-user of only (d) and (e). In some of those embodiments, if (c) a RNG 51 chooses a number (for instance, but not limited to, between one and ten), and the result is within a predefined range (for instance, but not limited to, greater than five), one of the upcoming outcomes will (d) award the player-user with a bonus round, and one of the upcoming outcomes will (e) pay out an award of at least a predefined amount of money or credits (and those situations are configured to be communication triggers), then the machine is configured to inform the player-user of outcomes (d) and (e) that the upcoming games include both a bonus round and an award of at least a predefined amount. Alternatively, in some embodiments, the machine is configured to inform the player-user if one of the upcoming games will result either in (f) one event (such as, but not limited to, a bonus round) or (g) another event (such as, but not limited to, a pay-out of at least $50), but if upcoming games will result in both (f) the first event and (g) the other event, the machine is configured to not inform the player-user of either upcoming outcome (f) or (g).

Figure 2:
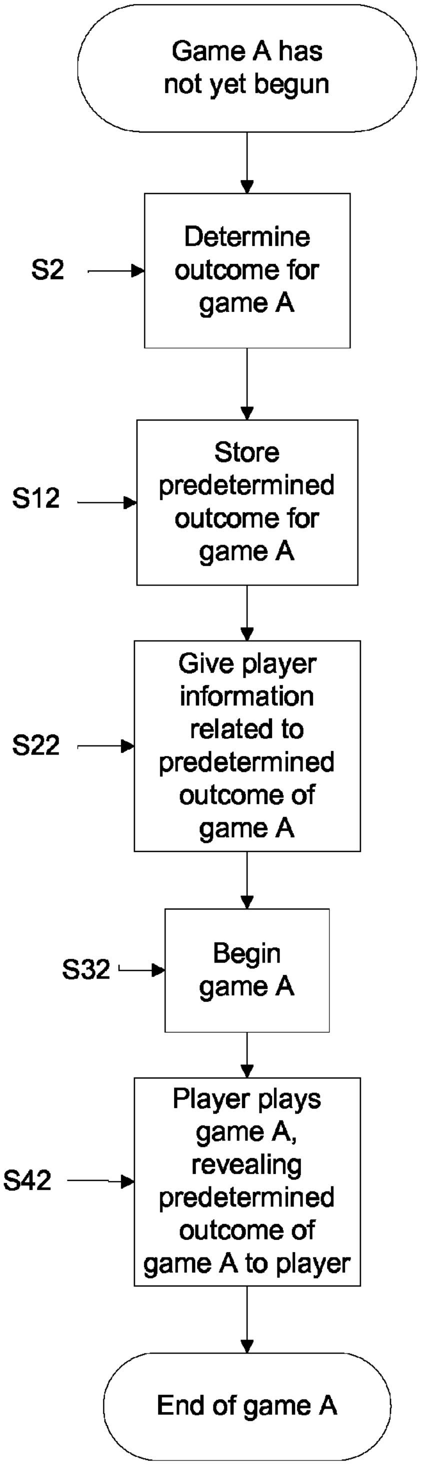
FIG. 2 is a flow diagram of a process for a gaming machine according to an embodiment of the present invention, wherein the outcome of the next game is predetermined before that game begins.

Example embodiments of a process implemented by the system 1 are described with reference to the flowchart in FIG. 2. Other embodiments are not limited to that process. In step S2, before a particular game ("game A") has begun, the outcome for game A is determined by a processing unit 21 of the system 1. According to some embodiments, the processing unit 21 determines the outcome by having a RNG 51 generate values that represent an outcome or part of an outcome of a game. In some example embodiments in which game A is Video Poker, the results for the hand (or one or more cards of the hand) of poker of game A will be predetermined in step S2. That is, the values of the hand that the player will receive during game A is determined, such as values that represent one or more (or each) card in the hand. Thus for an example hand having an Ace of Spades, King of Clubs, Queen of Hearts, Jack of Hearts, and Ten of Diamonds, a numerical value associated with one, some, or each of those cards is determined. In some example embodiments in which game A is a multi-reel slot machine, the values of one or more (or each) reel used during game A would be determined before game A is played, such as values that represent one or more (or each) reel. Thus for an example three-reel slot machine, the three reels set to a Cherry, a Bar, and a Cherry, a numerical value associated with one, some, or each of those reels is determined.

Then, in step S12, results determined for game A in step S2 will be saved in system memory 41. In some embodiments, this involves saving each of the numerical values generated by the RNG 51 during step S2.

In step S22, information about the results determined for game A in step S2 are relayed to the player-user. In some embodiments, this is done by displaying a message on the display 31 that is visible and/or audible to the player-user. In some embodiments, the information about the results discloses a portion of the overall game outcome, for example, that the player-user will receive a particular card or cards (such as, but not limited to an Ace of Spades) during game A. In some embodiments, the information about the results discloses the nature of the outcome, for example, that the player-user will have a winning hand during game A.

In step S32, play of game A begins. In some embodiments, this means that the player-user has input a start request (such as, but not limited to, pressing the "Play" button or pulling down the arm of a slot machine) and a credit has been deducted from the player-user's account.

In step S42, game A is played to its conclusion. The same outcome that was predetermined in step S2 for game A is used as the outcome of game A in step S42.

Example embodiments of a process implemented by the system 1 are described with reference to the flowchart in FIG. 3. Other embodiments are not limited to that process. The process of FIG. 3 differs from that of FIG. 2 because, in step S3 of FIG. 3, one, or more than one, game outcome is determined by the processing unit 21 in advance of game A. Additionally, the process of FIG. 3 differs from that of FIG. 2 because in step S3 of FIG. 3, according to some embodiments, the predetermined outcomes do not include the outcome for game A. According to other embodiments, the predetermined outcomes do include the outcome for game A. The predetermined outcomes are then stored in system memory 41 in step S13.

In step S23, the player-user is provided information relating to one or more of the predetermined outcome(s). In some embodiments, the information relates to a game that will be played at some defined time after game A will be played (for example, but not limited to, three games in the future). In some embodiments, the information relates to multiple games. In some example embodiments, the player-user is informed that one or more games of a defined number of games will have a given characteristic. In one non-limiting example, the player-user is informed that at least two of the next ten games will be winning games.

After step S23, the play of game A will begin at step S33 and complete during step S43. The outcome of game A will be determined during step S43 if it was not predetermined in step S3.

Example embodiments of a process implemented by the system 1 are described with reference to the flowchart in FIG. 4. Other embodiments are not limited to that process. In step S64 of FIG. 4, the processing unit 21 determines whether a communication trigger has occurred. If not, then game A begins at step S34 and completes at step S44.

Figure 3:
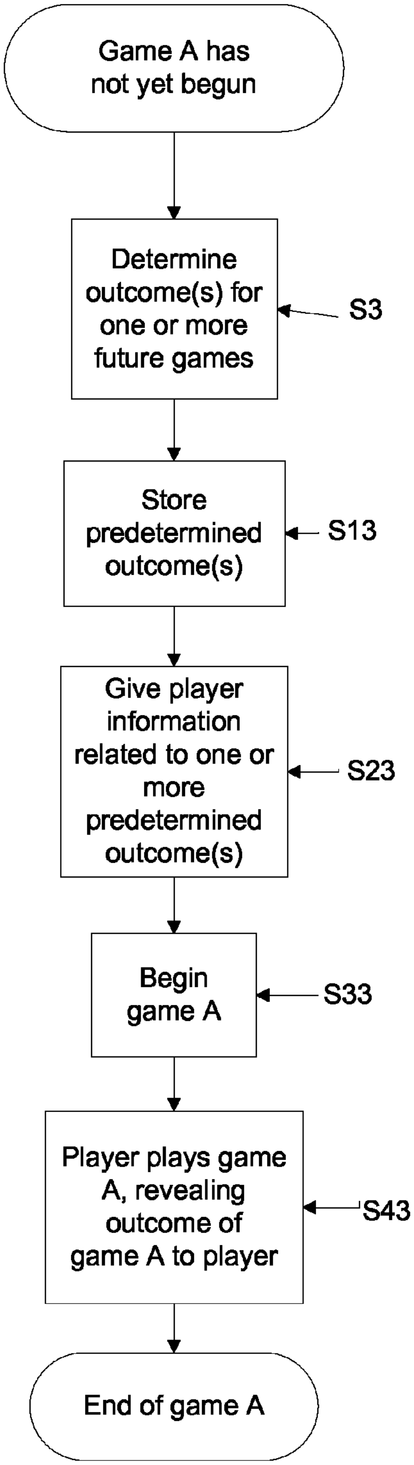
FIG. 3 is a flow diagram of a process for a gaming machine according to an embodiment of the present invention, wherein the outcomes of one or more games are predetermined before a particular game is begins.
Figure 4:
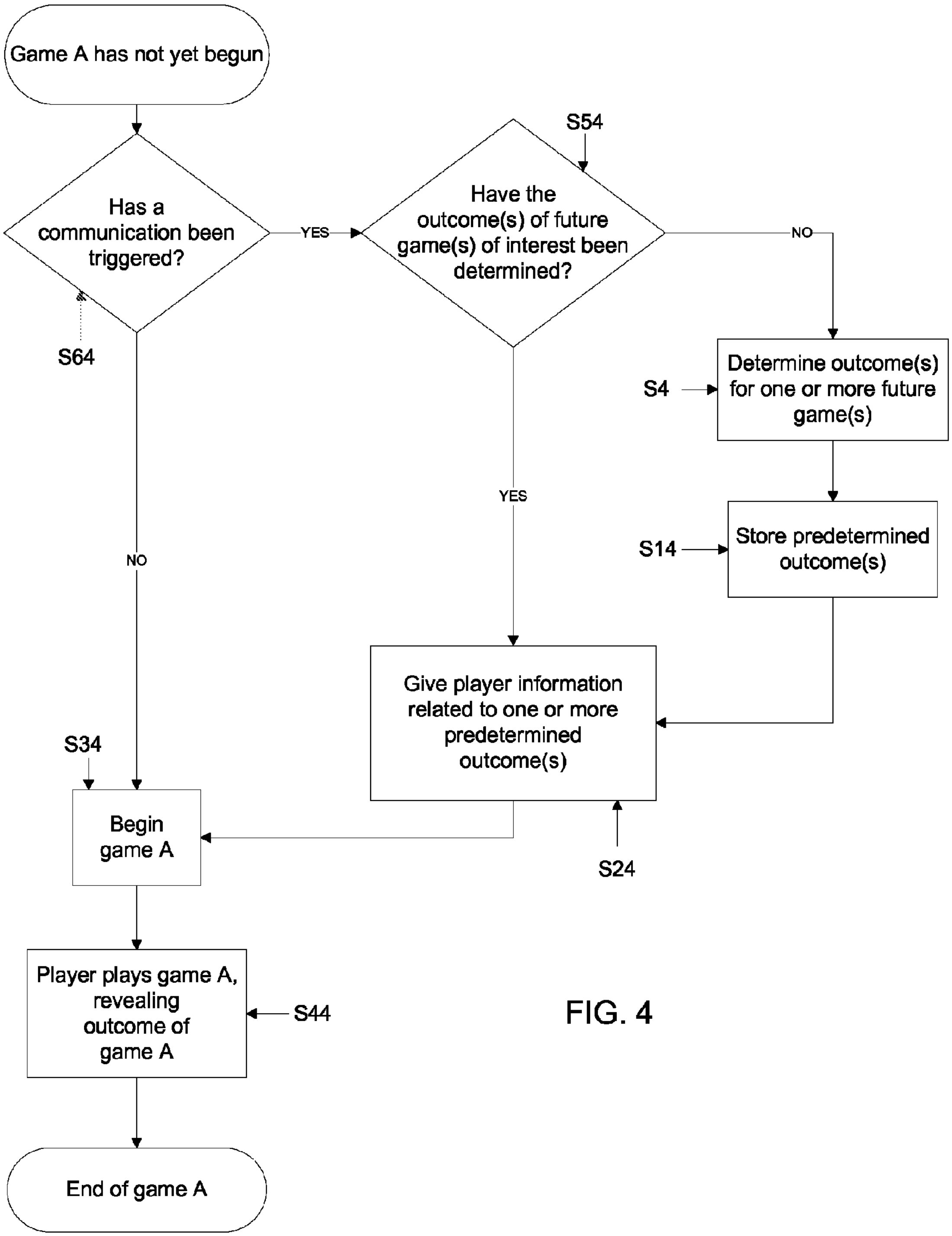
FIG. 4 is a flow diagram of a process for a gaming machine according to an embodiment of the present invention, wherein the outcomes of one or more games are predetermined before a particular game begins and related information is relayed to the player through an output device, but only if predefined conditions are met.

The process of FIG. 4 differs from that of FIG. 3 because, if a communication trigger has occurred, then in step S54 of FIG. 4, the processing unit 21 makes a determination about whether outcomes of future games of interest have been determined. In some embodiments, the future game(s) of interest includes game A and in other embodiments it is another game (other than game A). In some embodiments, which game or games will be used by the processing unit 21 to make this determination is set at the time the gaming machine is configured or during runtime of the gaming machine such as (but not limited to) being determined randomly using a RNG 51, or chosen by the player-user.

If the game(s) of interest has not yet been determined, the outcome(s) is determined in step S4 and stored in step S14. After the outcome(s) has been determined, or if it has already been determined, information about the outcome(s) is relayed to the player-user in step S24. Afterward, play of game A begins at step S34 and completes during step S44.

Embodiments of the present invention generally relate to methods and systems for operating a gaming machine. Although embodiments of the present invention are generally presented in the context of slot or video poker machines, various modifications will be readily apparent to those with ordinary skill in the art and the generic principles herein may be applied to other types of games, game machines, general purpose computers operating gaming programs or the like in other embodiments. Software or hardware, for instance, could incorporate the features described herein and that embodiment would be within the spirit and scope of the present invention. Thus, the present invention is not intended to be limited to the embodiments shown, but is to be accorded the broadest scope consistent with the principles and features described herein.

Various embodiments employing software and/or Web implementations are accomplished with standard programming techniques with rule-based logic and other logic to accomplish the various steps.

The embodiments disclosed herein are to be considered in all respects as illustrative, and not restrictive of the invention. The present invention is in no way limited to the embodiments described above. Various modifications and changes may be made to the embodiments without departing from the spirit and scope of the invention. The scope of the invention is indicated by the attached claims, rather than the embodiments. Various modifications and changes that come within the meaning and range of equivalency of the claims are intended to be within the scope of the invention.

What is claimed is:

1. A process of operating a machine for playing games, where each game has a plurality of possible outcomes and a resulting actual outcome that is at least one but not all of the possible outcomes for that game, the process comprising:
 selecting, with a processor of the machine, a plurality of games to be played on the machine, the plurality of games comprising at least a first game and a second game, wherein the first and second games will not be played simultaneously;
 determining, with the processor of the machine, the actual outcome of each of the first game and the second game before any of the plurality of games is played;
 storing each of the determined actual outcomes on non-transient storage media of the machine; and
 relaying, through an output device of the machine, information about at least one but not all of the determined actual outcomes, at a time before the first game has been played, wherein the time is before the second game has been played.

2. The process of claim 1, wherein the output device is an audio device or a visual device.

3. The process of claim 1, wherein the output device is an electronic image or video display.

4. The process of claim 1, wherein the machine is a slot machine.

5. The process of claim 1, wherein the machine is an electronic blackjack machine, an electronic keno machine, an electronic poker machine, or a video poker machine.

6. The process of claim 1, wherein the process further comprises:
 determining, with the processor of the machine, whether a communication trigger has occurred;
 wherein whether the information is relayed is at least partially dependent on whether a communication trigger has occurred.

7. The process of claim 6,
 wherein the communication trigger is that a predetermined number of consecutive games has been played;
 wherein the predetermined number is more than one.

8. The process of claim 6, wherein the communication trigger is that a user has paid a predetermined amount of credits or money.

9. The process of claim 6, wherein the communication trigger is dependent at least in part on an output of a random number generator.

10. The process of claim 6, wherein the communication trigger is at least partially related to a content of the outcomes.

11. The process of claim 1,
 wherein the actual outcome of the first game
 is separate from the actual outcome of the second game.

12. The process of claim 11, further comprising:
 determining, with the processor of the machine, the actual outcome of a third game of the plurality of games and the actual outcome of a fourth game of the plurality of games;
 wherein the actual outcome of the third game is separate from the actual outcomes of the fourth game, the second game and the first game.

13. The process of claim 1, wherein the relayed information does not identify which game of the plurality of games corresponds to the at least one of the determined actual outcomes that the relayed information is about.

14. The process of claim 1, wherein the relayed information includes information about the determined actual outcome of one of the first game or the second game but does not include information about the determined actual outcomes of both the first game and the second game.

15. The process of claim 1, wherein each of the outcomes is independently generated by a random number generator.

16. The process of claim 1, wherein each game of the plurality of games are to be played consecutively on the machine.

17. The process of claim 1, wherein neither of the first and second games is a bonus game of the other.

18. A system for operating a machine for playing games, where each game has a plurality of possible outcomes and an actual outcome that is at least one but not all of the possible outcomes for that game, the system comprising:

an output device for relaying information;

a processor configured to:

select a plurality of games to be played on the machine, the plurality of games comprising at least a first game and a second game, wherein the first and second games will not be played simultaneously;

determine the actual outcome of each of the first game and the second game before any of the plurality of games is played; and relay, through the output device, information about at least one but not all of the determined actual outcomes, at a time before the first game has been played, wherein the time is before the second game has been played; and a storage medium for storing the determined actual outcomes.

19. The system of claim 18, wherein the output device is an audio device or a visual device.

20. The system of claim 18, wherein the output device is a display.

21. The system of claim 18, wherein the machine is a slot machine.

22. The system of claim 18, wherein the machine is a an electronic blackjack machine, an electronic keno machine, an electronic poker machine, or a video poker machine.

23. The system of claim 18, wherein the processor is further configured to:

determine whether a communication trigger has occurred;

wherein whether the information is relayed is at least partially dependent on whether the communication trigger has occurred.

24. The system of claim 23, wherein the communication trigger is that a predetermined number of consecutive games has been played;

wherein the predetermined number is more than one.

25. The system of claim 23, wherein the communication trigger is that a user has paid a predetermined amount of credits or money.

26. The system of claim 23, wherein the communication trigger is dependent at least in part on an output of a random number generator.

27. The system of claim 23, wherein the communication trigger is at least partially related to a content of the outcomes.

28. The system of claim 18, wherein the relayed information does not identify which game of the plurality of games corresponds to the at least one of the determined actual outcomes that the relayed information is about.

29. The system of claim 18, wherein the relayed information includes information about the determined actual outcome of one of the first game or the second game but does not include information about the determined actual outcomes of both the first game and the second game.

30. The system of claim 18, wherein neither of the first and second games is a bonus game of the other.

* * * * *